United States Patent [19]
Kieves

[11] 3,747,170
[45] July 24, 1973

[54] CLAMP ARRANGEMENT
[75] Inventor: Raymond Kieves, Winnipeg, Manitoba, Canada
[73] Assignee: K-Tel International, Inc., Minneapolis, Minn.
[22] Filed: Nov. 10, 1971
[21] Appl. No.: 197,290

[52] U.S. Cl............ 24/263 B, 248/206 A, 248/346
[51] Int. Cl.. A44b 13/02, F16b 47/00, A47b 91/00
[58] Field of Search .......................... 24/263 B, 73 A; 248/206 A, 362, 363

[56] References Cited
UNITED STATES PATENTS

| 3,159,370 | 12/1964 | Rubinstein | 248/346 |
| 508,606 | 11/1893 | Eaton et al. | 248/363 X |
| 1,219,068 | 3/1917 | Bennett | 248/362 X |
| 2,623,369 | 12/1952 | Haydu | 248/30 L |
| 1,840,400 | 1/1932 | Lebherz | 248/362 |
| 3,180,604 | 4/1965 | Hammer | 248/363 X |

FOREIGN PATENTS OR APPLICATIONS
166,739   2/1950   Germany ........................... 248/363

Primary Examiner—Paul R. Gilliam
Attorney—Seymour Rothstein et al.

[57] ABSTRACT

A clamp arrangement for detachably securing a device to a work surface which includes a resilient member having substantial length and width secured to the bottom of the housing of the device and within the limits of the housing. An upright member is connected to the central portion of the resilient member and lever means are operatively connected to the upright member. The lever means cooperate with cam means to move the upright member and the resilient member connected thereto to lockingly engage the deivce in place on the work surface upon movement of the lever means in one direction and to effect release of the device from the work surface upon movement of the lever means in an opposite direction.

4 Claims, 7 Drawing Figures

PATENTED JUL 24 1973 3,747,170
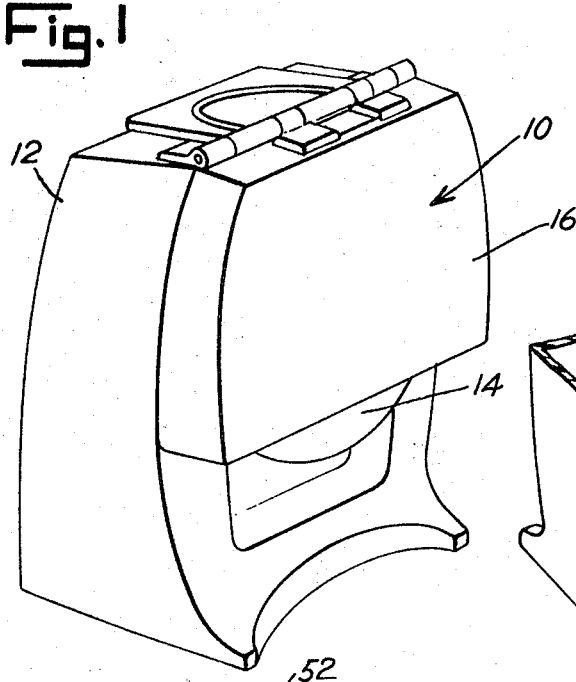
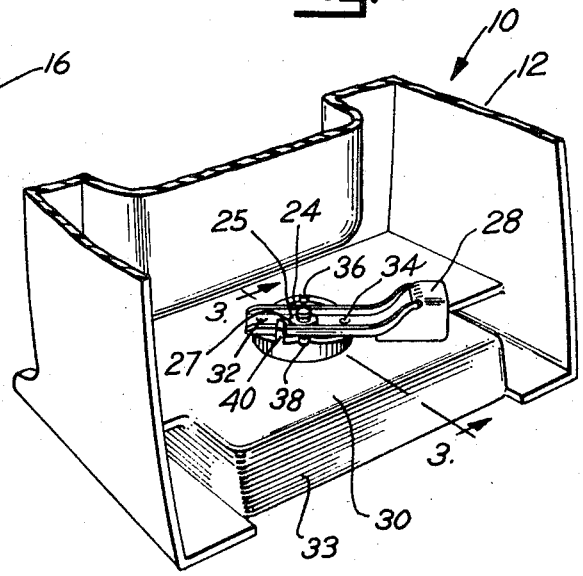
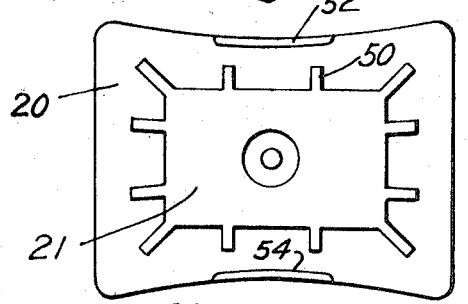
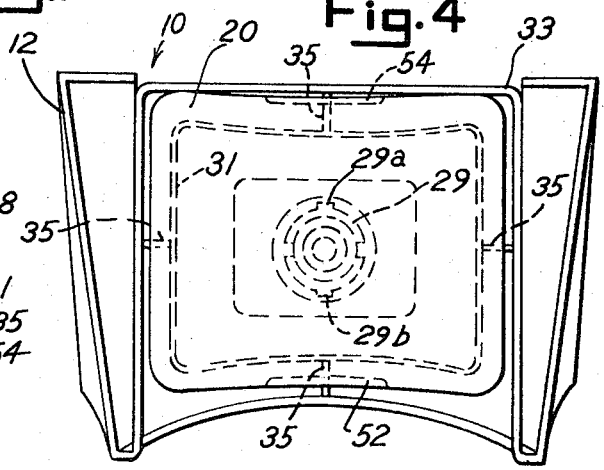
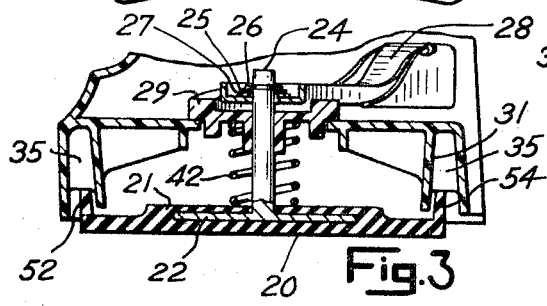
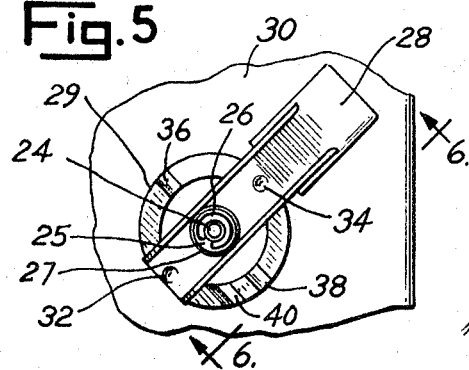
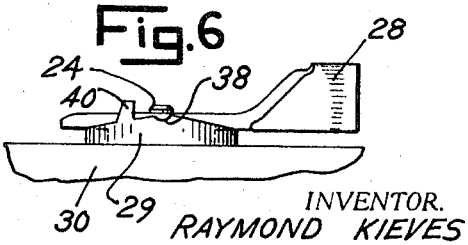
INVENTOR.
RAYMOND KIEVES
BY
ATTORNEYS

CLAMP ARRANGEMENT

BACKGROUND OF THE INVENTION

This invention relates to a clamp arrangement for detachably securing an appliance to a work surface and more particularly for a clamp arrangement for affixing a kitchen appliance to a flat work surface in a positive fashion for use and then readily releasing the appliance so that it can be transported to another place for use, cleaning or storage.

It has been known in the past to provide suction-type diaphragm means for securing a device in position for use. Reference may be made, for example, to Lebhertz U.S. Pat. No. 1,840,400 for a housing having a support mechanism incorporating a diaphragm secured to the bottom of the housing. The center portion of the diaphragm is connected to an actuator which is adapted to be rotated about a horizontal axis to secure the device to the work surface and then further actuated to release the device from the work surface. The diaphragm extends beyond the limits of the base of the housing and, therefore, is readily subject to the deleterious effect of food or the like product being prepared for use by the kitchen appliance. As the actuating arm of the Lebhertz device is rotatable about an axis horizontal to that of the planar work surface, it is somewhat cumbersome to utilize because the end of the actuator arm is relatively closely spaced from the work surface and sometimes difficult to grip and manipulate.

An object of the present invention is to provide an improved clamp arrangement for detachably securing a device to a work surface, such clamp arrangement being simple to manufacture and being constructed and arranged to effectively secure the device to a work surface for use, and also to permit ready detachment of the device from the work surface so that it may be readily moved.

Another object of the present invention is to provide a clamp arrangement for detachably securing a kitchen appliance to a work surface, the clamp arrangement including a resilient diaphragm member housed within the confines of the housing of the kitchen appliance and having an upright member secured thereto that is actuable by lever means rotatable about a generally vertcal axis and the lever means being disposed in a recess within the housing of the kitchen appliance.

Yet another object of the present invention is to provide an improved clamp arrangement for detachably securing a kitchen appliance to a work surface, the appliance including a housing having an inverted cup-shaped portion, with a resilient member extending in length and width beyond the entrance to the cup-shaped portion, the central portion of the resilient member being moved toward the cup-shaped portion to create a suction to clamp the appliance to the work surface, and movement of the central portion of the resilient member outwardly from the housing breaking the suction and releasing the appliance from locked engagement with the work surface.

Still another object of this invention is to provide an improved clamp arrangement for securing an appliance to a work surface, the appliance including a housing having an inverted cup-shaped portion and an external skirt portion, a resilient member larger in size than the entry to the cup-shaped portion, but smaller than the skirt portion, and an upright member secured to the central portion of the resilient member and being actuable by lever means cooperating with cam means on the housing, the lever means being rotatable 90 degrees about a vertical axis to effect clamping and release of the appliance. Other objects and advantages of the present invention will be made more apparent hereafter.

BRIEF DESCRIPTION OF THE DRAWING

There is shown in the attached drawing a presently preferred embodiment of the present invention wherein like numerals refer to like elements in the various views and wherein:

FIG. 1 is a perspective view of a kitchen appliance embodying the present invention;

FIG. 2 is a detail cross-sectional view of the kitchen appliance of FIG. 1 illustrating the improved clamp arrangement of the present invention therein;

FIG. 3 is a cross-sectional view of the kitchen appliance taken generally along the line 3—3 of FIG. 2;

FIG. 4 is a bottom view of the kitchen appliance of FIG. 1, illustrating the improved clamp arrangement;

FIG. 5 is a detail top view of a portion of the clamp arrangement illustrating the lever means and cam construction;

FIG. 6 is a detail elevation view illustrating the cooperation between the cam and lever of the improved clamp taken generally along the line 6—6 of FIG. 5; and FIG. 7 is a top view of the resilient member.

DETAILED DESCRIPTION OF THE PRESENT INVENTION

There is shown in FIG. 1 a perspective view of a device which incorporates the improved clamp arrangement of the present invention. As shown, the device 10 comprises a kitchen appliance for cutting, shredding or slicing food. It will be understood that the new clamp arrangement can also be used to secure other appliances to a work surface, for example a meat chopper. The device or appliance 10 includes a housing 12, a cutter wheel 14 rotatably secured to the housing and a protective shield or cover 16 over the face of the cutter wheel 14 for guiding the cut material downwardly where it may be received in a suitable receptacle, such as a bowl, resting on the work surface W to which the appliance may be secured.

Turning now to FIGS. 2, 3, 4, 5 and 6, there is better illustrated the clamp arrangement of the present invention. The clamp arrangement for detachably securing the appliance 10 to the planar work surface W comprises a resilient member or diaphragm 20 having substantial length and width. Centrally secured to the diaphragm or resilient member 20 is a stiffener 22 which has extending upwardly therefrom a stud or upright member 24 that is adapted to be connected at its upper end to lever means 28. The means for connecting the lever means 28 to the upright member include washer 25 and 27 disposed on the lever means 28 about the stud 24, and a retaining ring 26 that is secured to the stem or upright member 24 above the washer 25. It will be understood from this construction that the lever means 28 is rotatably secured to the upper end of the stem or rod member 24. Formed on the base 30 of the housing 12 of the appliance 10 are cam means 29, which are generally annular and extend upwardly from base 30. The cam means 29 may be formed integrally with the base 30, or it may be formed from a separate member as shown positionable and retained in an opening in the base. Projections 29a and 29b extend from diametrically opposed positions on the cam 29 in order to properly orient the cam 29 on the base 30. Thus, the lever 28 will be movable 90° from a 135° position to a 225° position readily accessible from the rear of the housing 12. Provided on the lever means 28 are detents 32 and 34 which are adapted to ride the cam surface of the cam means 29 between a low or dwell position shown, for example, in FIG. 2 and a high position wherein the detents 32 and 34 rest in the retaining recesses 36 and 38 of the cam surface. In the position shown in FIG. 2, one side of the lever means 28 is adapted to abut the stop 40 and when the lever means 28 is rotated 90°, another portion of the side will engage the stop 40, with the detents 32 and 34 disposed in the recesses 36 and 38.

As best seen in FIG. 5, the cam surface of cam means 29 is symmetrical about a line through the center of the retaining recesses 36, 38 and the axis of the shaft or upright stem member 24. Stop 40 extends upwardly from the upper cam surface in position to contact the side of lever 28 and stop the lever at its proper positions, one at the low point of the cam surface, and the other at the high point of the cam surface, with the detents engaged in the retaining recesses.

Disposed between the central portion of the diaphragm 20 and the housing 12 and concentric with the upright member 24 is a spring 24 which functions to hold the lever 28 in cooperative association with the cam surface of cam means 29, as well as to bias the resilient member or diaphragm 20 outwardly from the housing 12. FIG. 3 illustrates the released position of the resilient member or diaphragm 20 with respect to the work surface. The diaphragm or resilient member 20 extends beyond the entry opening to the inverted cup-shaped portion of the base 30 defined by wall 31 and the resilient member 20 lies within the outer walls 33 of the base 30, so as to be protected thereby.

When it is desired to effect clamping of the appliance 10 to the work surface W, the lever means 28 are rotated from the solid line position illustrated in FIG. 5 to the dotted line position so that the detents 32 and 34, respectively, depending from the lever means 28 are disposed in the retaining recesses 36 and 38 of the cam means 29. The detents 32 and 34 ride up the cam surface during rotation and thus raise the shaft or upright member 24 relative to the housing 12. The central portion of the diaphragm 20 is raised or moved toward the housing creating a suction to clamp the housing 12 to the work surface W, with the extremities of the diaphragm disposed against the lower portion of the inner walls 31 of the base 30 of housing 12.

With reference to FIGS. 4 and 7, there is better illustrated the configuration of the resilient member or diaphragm 20. The diaphragm is preferably constructed of rubber or like resilient member, preferably molded or formed with the central stiffener 22 therein. The upright stem or rod member 24 is either integral with the stiffener 22 or is formed from a separate member fixedly connected thereto. Extending outwardly from the central portion 21 of the diaphragm 20, within which is confined the stiffener 22, are stiffening ribs 50. The stiffening ribs 50 are of an extent such that they will lie within the area defined by the walls 31 of the inverted cup-shaped portion of the housing 12. Provided on opposite sides of the diaphragm 20 are projecting wall portions or raised portions 52 and 54 which are adapted to abut the depending transverse wall portions 35 at each side of housing 12 for helping to properly locate the ends or sides of the diaphragm relative to the extremities of the walls 31 of the inverted cup-shaped portion and for at least partially restraining the sides of the resilient member when the central portion is drawn inwardly.

In one presently preferred embodiment of the present invention, the diaphragm is approximately 5 inches long by 3-¾ inches wide at its narrowest point. The corresponding measurements of the inverted cup-shaped portion of the housing are approximately 4-½ by 3 inches.

There has been provided by the present invention an improved clamp for detachably securing a kitchen appliance to a work surface. The elements of the clamp arrangement are enclosed within the confines of the housing of the kitchen appliance so as to provide for an aesthetically pleasing appearance as well as to protect the components of the clamp from the deleterious effect of food product and to facilitate cleaning of the clamp arrangement during use of the kitchen appliance. Clamping and removal of the device from a work surface is readily effected by a simple 90° rotation of the lever means. The lever cooperates with a stop on the cam to provide the desired movement and is retained in a first position in the dwell of the cam. Spring 42 functions to retain the lever in engagement with the top of the cam surface. When the lever is rotated to a second position, the detents on the lever engage in the recesses in the cam. The vertical stem member 24 is raised together with the central portion of the diaphragm to effect a suction and to thereby clamp the appliance 10 in place on the work surface. 90° rotation of the lever 28 ack to the solid line position illustrated in FIG. 5 will effect release of the suction and permit the appliance 10 to be lifted from the work surface and transported to another place. The diaphragm or resilient member 20 is constructed and arranged so as to prevent food or like product from entering the bottom of the housing.

While there has been shown a presently preferred embodiment of the invention, it will be obvious to those skilled in the art that the invention is not so limited since it may be otherwise embodied within the scope of the following claims.

I claim:

1. A clamp arrangement for detachably securing a device to a work surface comprising a housing, a resilient member having substantial length and width secured to the housing by means of an upright member, spring means biasing the resilient member from the housing, cam means comprising a raised annular portion on the housing, the upright member extending through an opening in the annular portion lever means secured to the upright member for rotational movement therewith cooperating with said cam means so as to move the upright member and the resilient member connected thereto in opposition to the bias of the spring means upon movement of the lever means, the resilient member being lockingly engaged with the work surface upon movement of the lever means in one direction and being released from locking engagement with the work surface upon movement of the lever means in the opposite direction, said cam means including at least one retaining recess and the lever means including at least one detent engageable in the retaining recess to hold the lever means in a selected position relative to the cam means, said housing including an inverted cup-shaped portion, the resilient member being greater in length and width than the entrance to said cup-shaped member, the central portion of the resilient member being moved inwardly into the cup-shaped portion to create a suction to clamp the device to the work surface, with movement of the central portion of the resilient member outwardly from the housing breaking the suction and releasing the device from locked engagement with the work surface, said housing including an external skirt portion disposed about the cup-shaped portion and spaced therefrom, with the sides of the resilient member being between the walls of the cup-shaped portion and the skirt portion.

2. A clamp arrangement as in claim 1 wherein the resilient member has a stiffener secured to the central portion thereof, said upright member being secured to the stiffener, whereby movement linear of the upright member will cause movement of said central portion, said central portion being moved away from the work surface to create a suction to clamp the device to the work surface and being movable toward the work surface to break the suction to release the device.

3. A clamp arrangement as in claim 1 including transverse walls between the walls of the cup-shaped portion and the walls of the skirt portion, the resilient member having projecting portions adapted to abut said transverse walls.

4. A clamp arrangement as in claim 1 wherein the resilient member has stiffening ribs on the upper surface radiating outwardly from the central portion thereof.

* * * * *